(12) United States Patent
Goldberg

(10) Patent No.: US 6,173,290 B1
(45) Date of Patent: Jan. 9, 2001

(54) METHOD AND APPARATUS FOR COUPLING OBJECT STATE AND BEHAVIOR IN A DATABASE MANAGEMENT SYSTEM

(75) Inventor: Robert N. Goldberg, Redwood City, CA (US)

(73) Assignee: Sun Microsystems, Inc., Palo Alto, CA (US)

(*) Notice: Under 35 U.S.C. 154(b), the term of this patent shall be extended for 0 days.

This patent is subject to a terminal disclaimer.

(21) Appl. No.: 09/267,714

(22) Filed: Mar. 11, 1999

Related U.S. Application Data

(63) Continuation of application No. 08/720,227, filed on Sep. 26, 1996, now Pat. No. 5,907,847.

(51) Int. Cl.[7] .................................................. G06F 17/30
(52) U.S. Cl. ............................................. 707/103; 707/2
(58) Field of Search .................................. 707/100–103, 707/10.1–10.3; 709/303, 200–201; 395/705–710

(56) References Cited

U.S. PATENT DOCUMENTS

| | | | |
|---|---|---|---|
| 5,291,583 | 3/1994 | Bapat | 395/500 |
| 5,295,256 | 3/1994 | Bapat | 395/500 |
| 5,566,330 | 10/1996 | Sheffield | 707/100 |
| 5,577,251 | 11/1996 | Hamilton et al. | 707/1 |
| 5,644,764 | 7/1997 | Johnson et al. | 707/103 |
| 5,790,861 | * 8/1998 | Rose et al. | 395/705 |
| 5,907,847 | * 5/1999 | Goldberg | 707/103 |

FOREIGN PATENT DOCUMENTS 2253500  9/1992  (GB).

OTHER PUBLICATIONS

Gardarin, George et al. "Extending a Relational DBMS to Support Complex Objects," Second International Conference on Data and Knowledge Systems for Manufacturing and Engineering, Oct. 16–18, 1989, Gaithersburg, MD, U.S., pp. 131–137.

* cited by examiner

Primary Examiner—Hosain T. Alam
(74) Attorney, Agent, or Firm—The Hecker Law Group

(57) ABSTRACT

A method and apparatus for coupling object state and behavior in a DBMS is provided such that an object's class definition, behavior information, and state information are included in the DBMS. An object is instantiated using an object class definition, state information, and behavior information from the DBMS. In addition, an object can be stored in the DBMS by storing its class definition along with its state and behavior information in the DBMS. The behavior information stored in the DBMS can be used within and without the DBMS environment.

28 Claims, 6 Drawing Sheets

METHOD AND APPARATUS FOR COUPLING OBJECT STATE AND BEHAVIOR IN A DATABASE MANAGEMENT SYSTEM

This is a continuation of application Ser. No. 08/720,227, filed Sep. 26, 1996 now U.S. Pat. No. 5,907,847.

BACKGROUND OF THE INVENTION

1. Field of the Invention

This invention relates the coupling of state and behavior of an object in a DBMS and in application programs that access the DBMS.

2. Background Art

Existing Database Management Systems (DBMSs) cannot guarantee full coupling of an object's state and behavior in the client environment. In an object-oriented environment, a software application uses a module or entity referred to as an object. An object is comprised of both state and behavior. An object's state is determined by the set of values an object carries for a set of properties or variables. A property can be an attribute of the object or a relation between the object and one or more other objects.

Behavior is defined by the set of operations that can be performed with the object. Each operation is implemented in a routine that is referred to as a method. An object can include a plurality of methods. An operation is performed by invoking one of the object's methods. A method invocation usually occurs as a result of a message sent to an object by another object. The message identifies the method, or operation, that is to be performed. In addition, the message may contain a plurality of properties or arguments that are used by the method.

In the prior art, a DBMS only manages an object's state. Thus, for example, when an application needs an object, it can only retrieve the object's state from the DBMS. The object's method(s) must be retrieved from another source such as a class library, for example.

In addition, the introduction of user-written code in a DBMS engine can compromise the integrity of the engine and is therefore not recommended. To ensure the integrity of the DBMS, a separate implementation of the same object method used by a client is stored in the DBMS server environment. The implementation stored in the DBMS is referred to as a stored procedure. Stored procedure languages are not object-oriented programming languages. A stored procedure is not locally invokable in a client's environment and the DBMS does not use the client's object method. Thus, in the prior art, the same logic is duplicated for different environments. This results in increased development and maintenance costs, and the possibility of serious inconsistencies in object behavior.

As more fully described below, prior art capabilities do not include an ability to store a complete object definition that can be accessed in both a DBMS server and client environment. Object definitions used in these two different environments are effectively stored in separate locations resulting in synchronization issues. In addition, each client application must incorporate all the class libraries that contain any needed functionality. The use of polymorphism (e.g., the ability to refer to different things having different forms) is greatly restricted. Thus, there is added complexity in the management of each client application. This results in additional development and maintenance costs as well as the possibility for inconsistencies.

Relational DBMS

An attribute of an object can be set in a variety of ways. One way is by retrieving information stored in a database management system (DBMS) into a property of the object. A relational DBMS stores information in a table or relation. A table consists of a set of rows and columns. A column defines a field in a row. A row is collection of fields that represents one instance or record of data. The following provides an example of an Employee table for storing employee information:

| First Name | Middle Name | Last Name | EmployeeID | Salary | Manager | Level |
|---|---|---|---|---|---|---|
| Peter | Thomas | Smith | 345789 | $50,000 | 804356 | P4 |

In this example, the Employee table contains a single row (a table can contain multiple rows, however) that is comprised of seven columns or fields (i.e., First Name, Middle Name, Last Name, EmployeeID, Salary, Manager, and Level). The data stored in the Employee table can be retrieved and used by an application. A data manipulation language (DML) is used to formulate a query to retrieve the data. For example, a query can be used to retrieve the row of the Employee table illustrated above.

In addition to storing application data, the DBMS uses tables to store schema data, or metadata. Metadata contains information that describes the structure of the data stored in the DBMS. For example, metadata identifies the tables contained in the DBMS and the columns in each table. Metadata is defined using a data definition language (DDL).

The metadata may include a Tables relation to define each table in the DBMS. The following provides an example of the Tables relation that contains a record for the Employee table:

| Name | Number of Columns |
|---|---|
| Employee | 7 |

In the above example, the Tables relation contains a record for each table in the DBMS. Each record contains two columns: Name and Number of Columns. The Name field identifies the name of a table and the Number of Columns field defines the number of columns in the table defined by the record.

To further illustrate, the metadata may contain a columnName table that identifies all of the columns defined in a table in the DBMS. The following provides an example of an entry in the columnName table for the First Name column in the Employee table:

| Name | Table Name | Column No. | Column Type | Length |
|---|---|---|---|---|
| First Name | Employee | 1 | char | 20 |

Each column in a table has a record in the columnName table. Each record in the columnName table has fields that further define the associated column. For example, the columnName table may include Name, Table Name, Column No., Column Type and Length columns or fields. In the above example, the columnName table contains a record that defines the First Name column as the first column in the Employee table and having a length of twenty characters.

Stored Procedures

To implement logic, a relational DBMS uses stored procedures implemented in a special language (e.g., Oracle's PL/SQL) that execute safely in the database server environment and that can be invoked using queries. However, the stored procedures that run in a relational DBMS environment do not provide mechanisms to dynamically distribute the procedures to clients so that they can execute at the client. Thus, the logic implemented by a stored procedure in the DBMS must be duplicated at the client. This duplication requires additional development costs. Further, any modifications or upgrades must be ported to each storage site thereby duplicating development efforts and increasing costs.

Object-Oriented DBMS

Like relational DBMS's, an object-oriented DBMS (OODBMS) stores an object's state on disk. An OODBMS typically uses a library implementation to retrieve an object. An OODBMS stores an object's state on disk and maps it into programming language objects. The state is mapped into the object such that the state can be retrieved from the DBMS and stored in the object's attributes when the object is instantiated. The object's class is defined in a compiled library that includes the object's behavior. The library is linked into the program from compiled libraries (typically written in C++) and used at run time to define the object's behavior. It is up to the database designer to distribute the class libraries to the client systems and keep these libraries up-to-date with the methods and objects stored in the database, if any. A database designer must distribute the class libraries to client systems and ensure that they remain current and synchronized across multiple sites with the state definition contained in the DBMS.

FIG. 2 provides an illustration of object retrieval using an OODBMS. DBMS 200 consists of schema 202 and data 206. DBMS 200 is an OODBMS. Schema 202 comprises the metadata that defines the structure for data 206. Data 206 contains application data such as that stored in the Employee table illustrated above. DBMS 200 does not store both state and behavior information such that the behavior can be retrieved into a client environment. DBMS 200 may encode behavior as stored procedures that execute in the DBMS engine. DBMS 200 stores only state information that can be retrieved into the client environment.

Object 208 includes both state and behavior. However, because DBMS 200 does not store both state and behavior, the state and behavior of object 208 must be retrieved from different sources. DBMS 200 contains state information for object 208. The state information for object 208 is stored in data 206. Library 204 contains the behavior of object 208 as well as a class definition for object 208. When object 208 is instantiated, an instance of its class as defined in library 204 is created. The state of object 208 is then set by retrieving the state information stored in data 206 into properties of object 208.

It is not possible to couple both state and behavior information for an object retrieved into a client from a relational DBMS. This results in the need to obtain an object's definition by accessing multiple sources. The DBMS server and its clients access separate sources to obtain behavior information. This raises synchronization and consistency issues between the DBMS server and the client. The synchronization issue is magnified when multiple clients are accessing different class libraries for the same class definition.

Query Languages

Referring to FIG. 2, DBMS 200 uses a DML to maintain the information stored in data 206. For example, SQL can be used to express select, update, insert and delete operations on tables in a DBMS. The DML primarily used by DBMS's is Structured Query Language (SQL). SQL is used to perform operations on data 206.

A new version of SQL referred to as "SQL3" is currently being defined by the ANSI X3H2 "SQL3" Committee that provides "object-relational" extensions to the existing SQL language. The SQL3 implementations are designed to store object attributes and metadata describing the object types in the database. However, these implementations do not provide the ability to couple behavior with state such that a retrieval operation can yield both state and behavior from the same source using the same operation.

SUMMARY OF THE INVENTION

A method and apparatus for coupling object state and behavior in a DBMS is provided such that an object's class definition, behavior information, and state information are included in and managed by the DBMS. An object is replicated by retrieving the object's class definition, state information, and behavior information from the DBMS. In addition to retrieval, an object can be stored in the DBMS by storing its class definition along with its state and behavior information in the DBMS. The behavior information stored in the DBMS can be used within and without the DBMS server environment.

Behavior information is preferably defined using a programming language that is secure, portable, and interoperable. The security characteristic ensures the integrity of the behavior implemented by the language. Portability and interoperability allow the behavior to be ported to any computing environment without modification. An example of such a language is Java. Other languages that may be used include PL/SQL and SQL/PSM. In addition, JAVA extensions that compile to JAVA source or JAVA byte codes are candidate languages.

A schema coupled to a DBMS server is used to store class and behavior definitions for an object. A state portion of the DBMS stores a state definition for the object. A client process having a mechanism for initiating behavior (i.e., a behavior initiator) accesses the DBMS server to obtain an object having both state and behavior. Once retrieved, the mechanism is used to invoke the object's behavior. The mechanism is a language interpreter or a just-in-time (JIT) compiler, for example. An object manager can be used to manage object references, determine when behavior is out-of-date, and determine when updates are propagated to the DBMS.

A client can be local or remote to the DBMS server. For example, a client can be connected to the DBMS server via a local area network (LAN). In addition, the client can be linked to the server via the Internet or World Wide Web. That is, the invention can be used to distribute an object's state and behavior to a client via the Internet or World Wide Web (WWW). In addition, a client can use the Internet or WWW to transmit a request to invoke a method of an object stored in the DBMS server environment.

DETAILED DESCRIPTION OF THE INVENTION

A method and apparatus for coupling object state and behavior in a DBMS is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
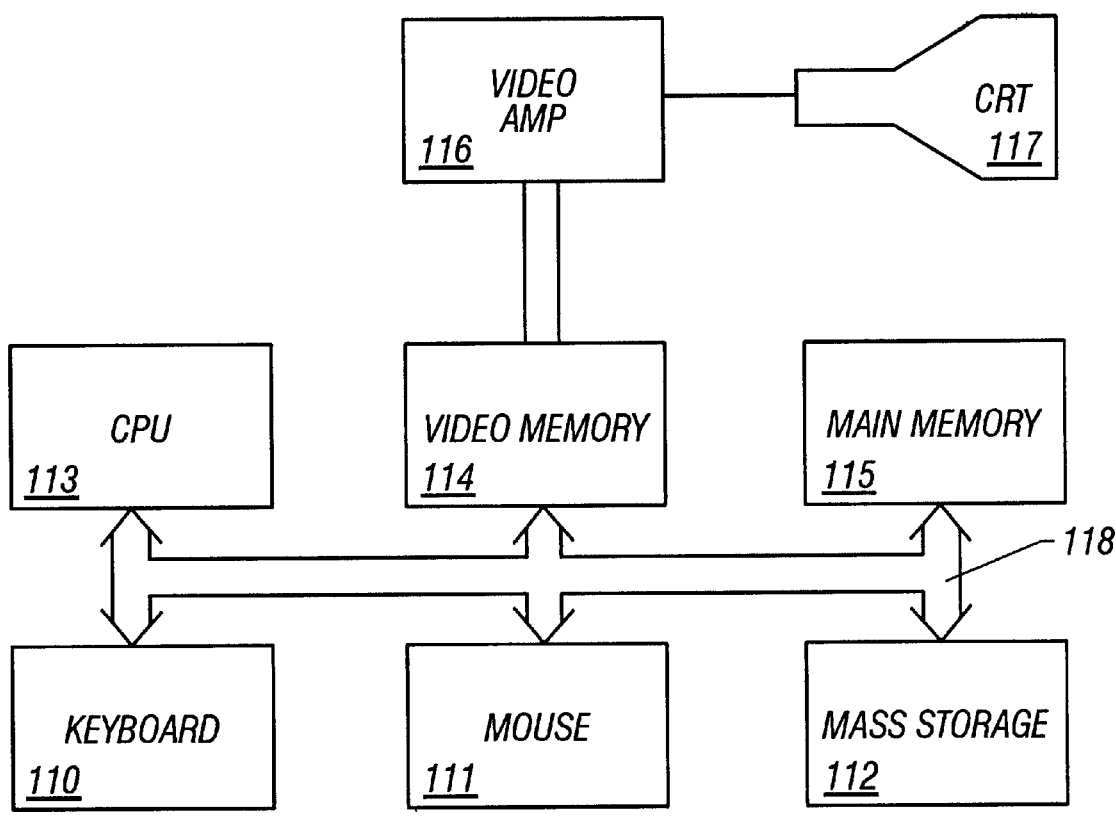
FIG. 1 provides an example of a general purpose computer to be used in accordance with embodiments of the present invention.
Figure 2:
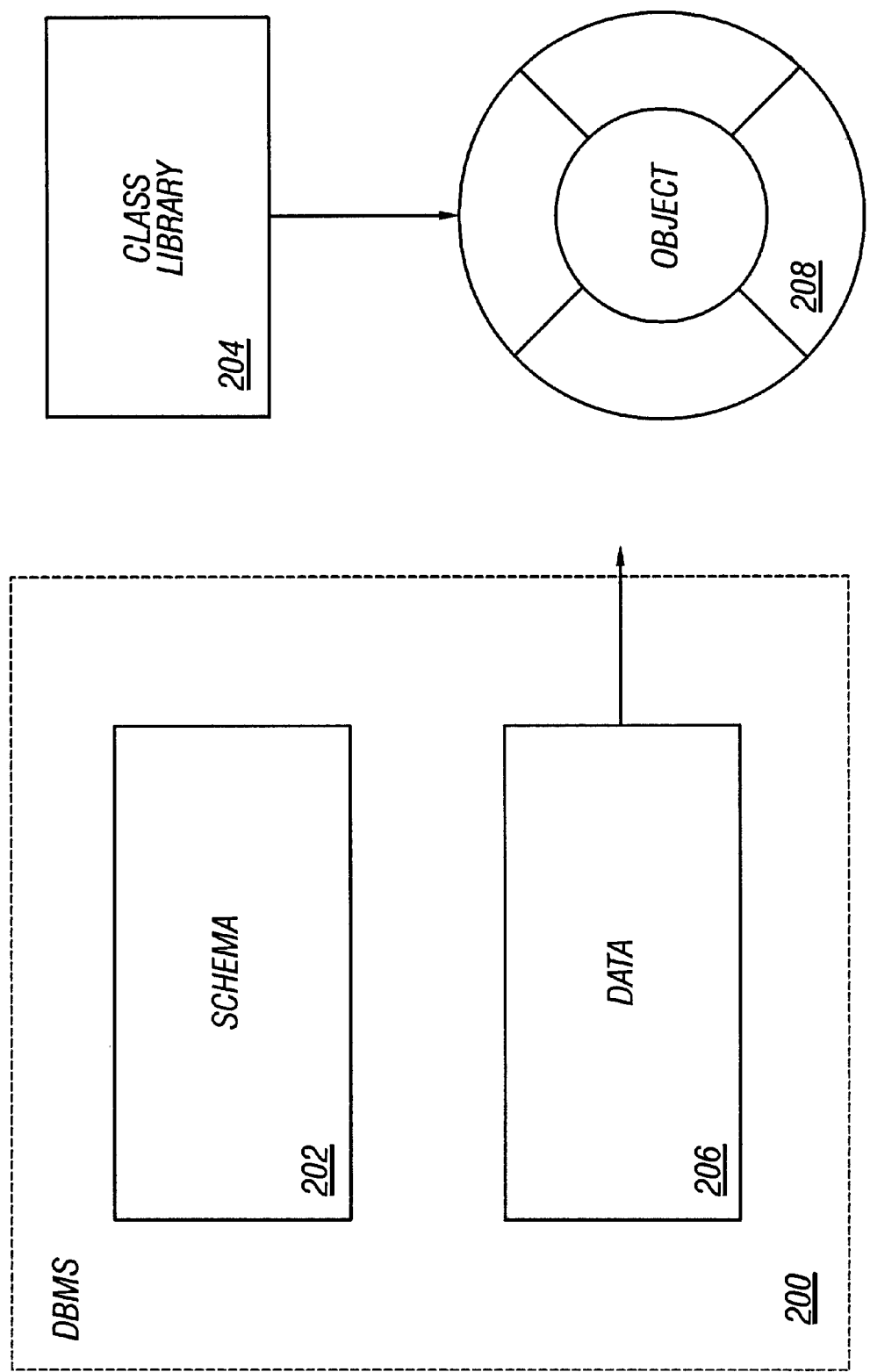
FIG. 2 provides an illustration of object retrieval using a DBMS.

The present invention can be implemented on a general purpose computer such as illustrated in FIG. 1. A keyboard 110 and mouse 111 are coupled to a bidirectional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 processor, a 80X86 microprocessor manufactured by Intel, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. For example, a DBMS server may not necessarily have a monitor, keyboard and mouse. The present invention may be implemented in any type of computer system or programming or processing environment. When a general purpose computer system such as the one described executes the processes and process flows described herein, it is configured to couple object state and behavior in a DBMS.

Figure 3:
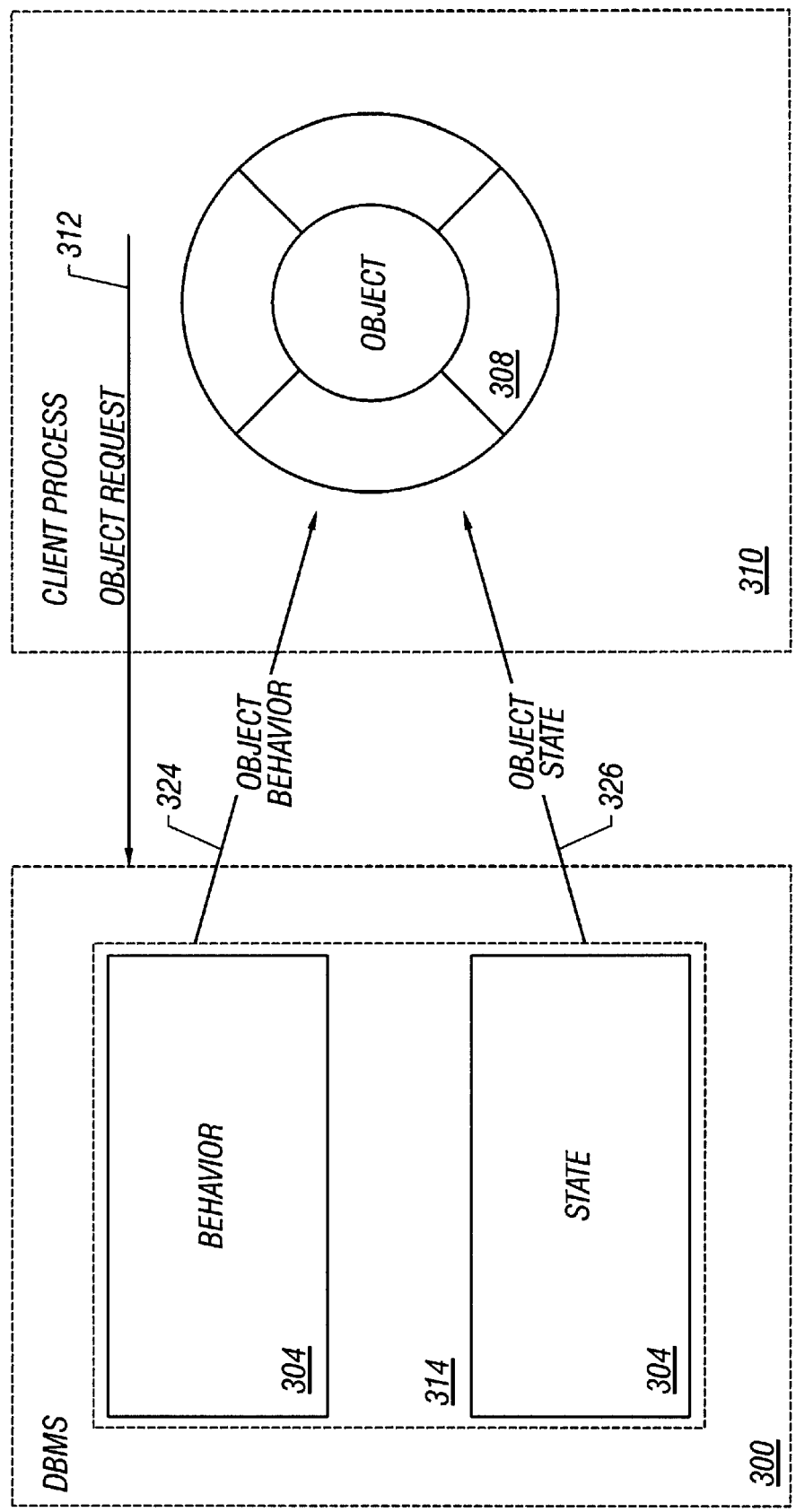
FIG. 3 provides an example of object retrieval according to one embodiment of the present invention.

An object's state and behavior is tightly coupled thereby providing a current and complete object definition that can be retrieved from the same source. Further, an object's definition is stored in one logical database (e.g., one or more databases) thereby minimizing retrieval and maintenance operations. In the preferred embodiment, an object's definition is stored as data in the DBMS. That is, both the state and, behavior of an object are stored reliably in the DBMS. A modification to an object's state and behavior can be made to one logical database within a single transaction. Further, when an object is replicated (in a client process, for example), both its state and behavior definition can be retrieved from a single location (i.e., the DBMS). FIG. 3 provides an example of object retrieval according to one embodiment of the present invention.

DBMS server 300 includes object definition 314. Object definition 314 includes behavior 304 and state 306. Client process 310 is executing and generates request 312. Request 312 can be a request for object 308, for example. When object request 312 is received by DBMS server 300, DBMS server 300 accesses object definition 314 to retrieve object 308.

Object definition 314 includes state and behavior information that is used to satisfy request 312. Behavior 304 and state 306 can be stored in any manner used by DBMS server 300. Preferably, behavior 304 is stored as part of the schema, or metadata, along with a object class definition for object 308. DBMS server 300 retrieves object state 326 from state 306 and behavior 324 from behavior 314 and returns object 308. Thus, object request 312 from client process 310 is satisfied from a single logical source. There is no need for client process 310 to access a separate class library to retrieve the behavior and class definition for object 308.

Figure 4:
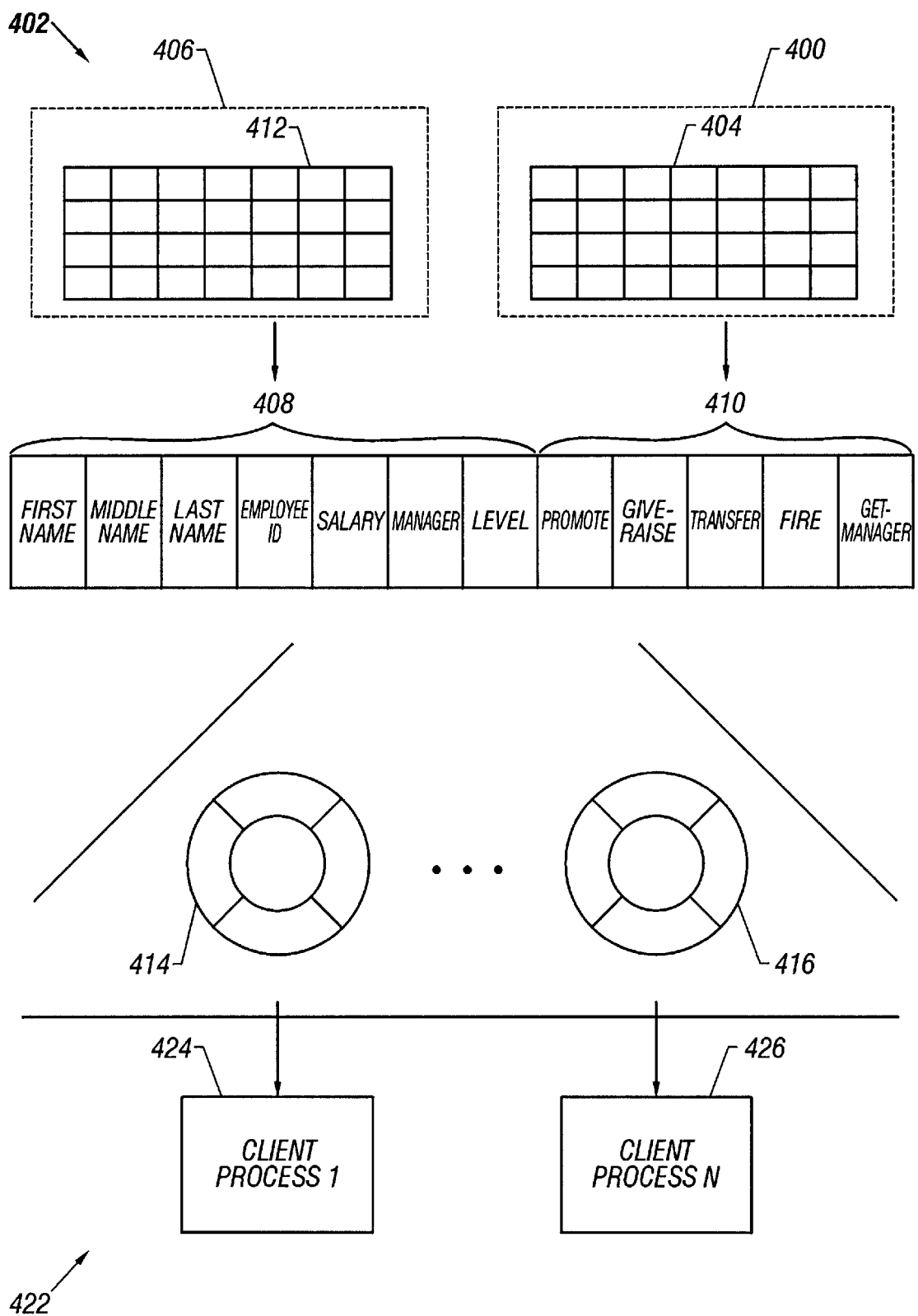
FIG. 4 provides an example of retrieval relations having state and behavior information according to one embodiment of the present invention.

The storage technique used to retain state 306 and behavior 314 depends on the type of DBMS. For example, in a relational DBMS, behavior 304 and state 306 can be stored in one table or multiple, related tables. FIG. 4 provides an example of relations having state and behavior information according to one embodiment of the present invention.

DBMS server 402 includes schema 400 and data 406. Schema 400 defines the structure of the DBMS. Schema 400 further includes relation 404. Relation 404 is illustrated as a single table. However, relation 404 can consist of multiple tables. Relation 404 contains an object class definition and behavior for objects 414–416. An object class definition typically consists of a type and attribute declarations. Relation 404 further includes the methods associated with the object class definition. For example, relation 404 defines an Employee object class and behavior 410 for the Employee object. In this example, behavior 410 consists of the promote, giveRaise, transfer,fire and getManager methods.

DBMS server 402 further includes data 406. Data 406 stores state information to populate attributes of an instance of the Employee object class. Data 406 includes Employee table 412 that contains state information 408 that can be used to populate attributes of the Employee object. State 408 contains employee attribute information such as: First Name, Middle Name, Last Name, Employee ID, Salary, Manager, and Level. DBMS server 402 retrieves the state information 408 from Employee table 412. In this example, a single table is used to retain state information. However, it should be apparent that multiple tables can be used to store state information.

State 408 and behavior 410 are coupled together to create an Employee object instance from the Employee object definition. Examples, of Employee object instances are objects 414 and 416. Object 414 is created in response to a request generated by client process 424. Object 416 is generated in response to a request by client process 426. Client processes 424 and 426 reside in client environment 422.

Client environment 422 can consist of multiple systems. Client processes 424 and 426 can reside on the same or different systems. In the prior art, it would be necessary to either store a class library at each system in client environment 422, or to allow access to a shared library via a file server. In the latter case, the library is outside the DMBS' control. In the former case, client processes 424 and 426 reside on different systems, each would access a separate class library to retrieve a behavior definition for objects 414 and 416, respectively. It is necessary when using this prior art approach to attempt to synchronize the object definitions stored at each site. In contrast, client processes 424 and 426 can access the same location to retrieve state and behavior information using the present invention. Thus, synchronization of state and behavior information is ensured using the present invention.

Further, the present invention facilitates the passing of objects in a distributed object environment such as NEO. NEO is a development environment and runtime system for developing and deploying distributed objects on a Common Object Request Broker Architecture (CORBA) infrastructure. There are two distinct ways to pass around objects stored in a database: (1) by reference (e.g., CORBA objRefs), or (2) via object replication. Using the present invention, an object can be replicated and passed by retrieving the object definition (i.e., state and behavior) from DBMS server 402.

Behavior 410 can be of any form capable of being stored in the DBMS. Preferably behavior 410 is implemented such that it is secure, portable and interoperable. DBMS administrators are reluctant to allow user-written code to execute within the DBMS engine unless it is "safe". Similar considerations apply to application programs that download code from a server to be executed on the client (e.g., a web browser). A secure implementation reduces the potential for viruses that might compromise the DBMS server or the client environment.

A portable implementation permits behavior 410 to run in any standard computing environment and platform without modification. Being interoperable, behavior 410 can be stored in a form that can be sent directly to another computing environment without translation.

An implementation having the characteristics of security, portability and interoperability can be achieved using a programming language such as Java. Java provides the ability to translate a source definition into a series of bytes referred to as byte codes that can run in any standard computing environment without any translation. In addition, Java provides a source checking mechanism that disables execution if the source of the code is not known.

Alternatively, another language such as PL/SQL or ANSI SQL/PSM can be used as the source for defining behavior 410. The PL/SQL and ANSI SQL/PSM source is then compiled-into Java byte codes. It should be apparent that any language that preferably includes the characteristics of security, portability and interoperability can be used to implement behavior 410.

A mechanism must be provided for invoking the methods applied to a retrieved object on the client. That is, for example, a mechanism must be provided for invoking behavior 410 of object 414 on client process 424. This can be achieved by providing an interpreter or a just in time (JIT) compiler on client 424 to execute behavior 410. When object 414 receives a message to invoke the giveRaise behavior of behavior 410, an interpreter or JIT compiler is used to execute the giveRaise behavior. The mechanism for invoking or initiating the behavior can be bundled with or separate from the operating system.

An object cache mechanism, or object manager, is preferably used in both the client and server environments (e.g., client environment 422 and DBMS server 402, respectively). An object manager maintains the references to other objects and determines when updates are propagated to the DBMS. The particular object cache mechanism that is used is dependent on the client programming language as well as the method implementation language. An embedded SQL preprocessor could be used to assist in making the method implementation language suitable for expressing methods that follow object references and that affect other objects.

An object manager can further determine when behavior is out-of-date. For example, a time stamp can be used that identifies when an object's behavior that is stored at the DBMS server was last changed. Every time an object is retrieved from the DBMS server, the time stamp can be examined to determine whether the version of the behavior that is stored in the client is out-of-date, for example. If so, the changes can be propagated to the client.

As previously illustrated, the present invention can be implemented using a relational DBMS. However, it should be apparent to one skilled in the art that the present invention can be implemented in other environments. For example, an object-oriented DBMS can be used.

Figure 5A:
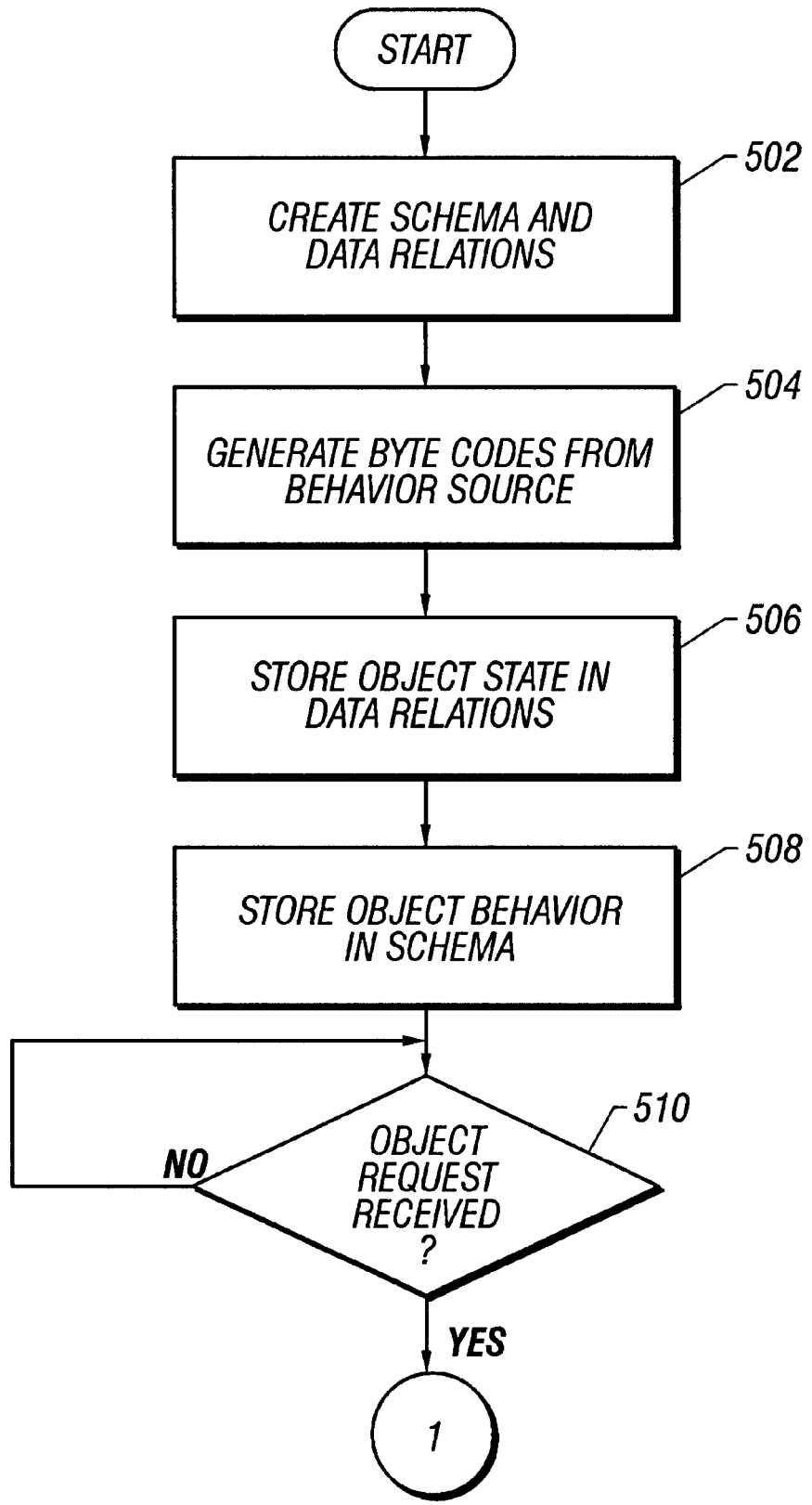
FIGS. 5A–5B provide a process flow using a relational DBMS according to one embodiment of the present invention.
Figure 5B:
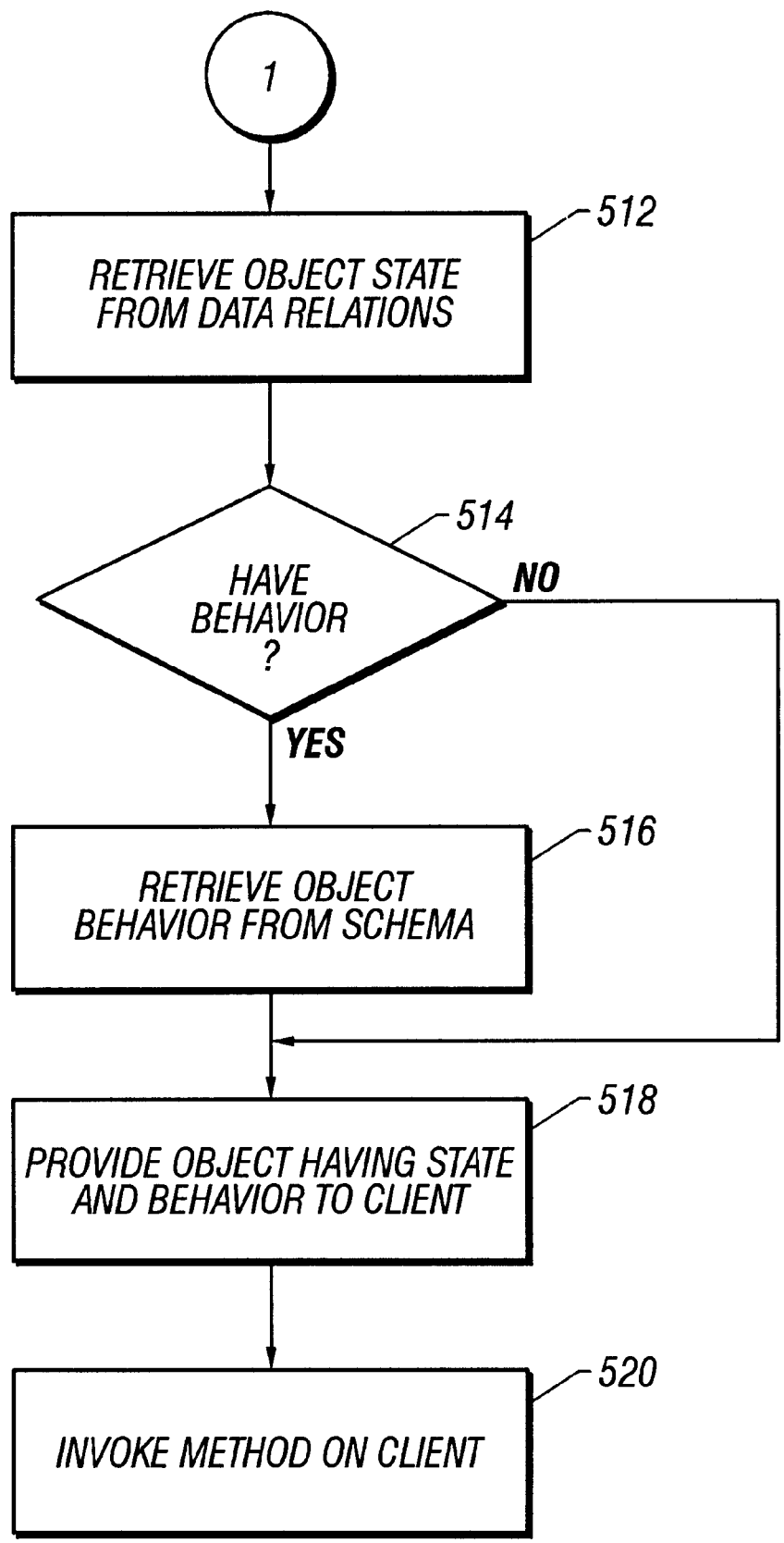

FIGS. 5A–5B provide a process flow using a relational DBMS according to one embodiment of the present invention. At step 502, a schema, or metadata, and data relations are created in the relational DBMS. At step 504, an executable form of object behavior is created. For example, source code that defines a method of an object is compiled to create an executable form. The source code is, for example, written in the Java programming language. Java byte codes are generated from the Java source.

At step 506, the object state is stored in data relations of the relational DBMS. At step 508, a class definition and behavior associated with an object are stored in the DBMS' schema relations. At step 510 (i.e., "object request received?"), a determination is made whether the DBMS server has received a request for the object. If a request is not identified, the DBMS server can perform whatever other processing is needed.

When a request is received, processing continues step 512 to process the object request. At step 512, the object's state is retrieved from the DBMS' data relation(s). At step 514 (i.e., "have behavior?"), a determination is made whether the behavior for that class of object has already been retrieved. If not, processing continues at step 516 wherein the object behavior and class definition are retrieved from the schema relation(s). After the retrieval operation is performed at step 516, or if it is determined that the object's behavior has already been retrieved, processing continues at step 518. The new object instance having both state and behavior is provided to the requester, or client. The object is thereby activated in the client environment. For example, the state and behavior are copied into executable address space (e.g., a client process) to allow execution of the object's behavior on the object's state.

The object instance retrieved from the DBMS server includes properties initialized with state information stored in the DBMS. In addition, the object instance includes behavior or methods that can be invoked on the client. At step 520, a method of the object is invoked using a behavior interpreter or JIT compiler, for example.

FIGS. 5A–5B describe an embodiment whereby an object is activated at a client. The invention can also be used to activate an object within the DBMS server. FIGS. 5A–5B can modified to illustrate the activation of an object's state and behavior in the DBMS server environment.

Steps 502–508 function in the manner described above. Thus, an object's state and behavior can be created and stored in the DBMS server environment regardless of whether the object is to be activated in the client or the DBMS environment. At step 510 (i.e., object request received?"), a determination is made whether a request is being made for activation of an object in the DBMS server environment. For example, a client wishing to activate an object in the DBMS server can transmit a query to the DBMS server such as the following SQL-3 query:

| | |
|---|---|
| SELECT | emp.getManager |
| FROM | Employee emp |
| WHERE | emp.employeeID='764982' |

In the above example, the object emp is retrieved and the behavior emp.getManager is invoked to obtain the manager object in the DBMS server. When the DBMS server determines that the emp object is to be retrieved as a result of the client request, for example, processing continues at step 512. At step 512, the object state (e.g., for the emp object) is retrieved from the data relations stored at the DBMS server. As discussed above, an object's behavior could have previously been retrieved from the DBMS. If not, however, the object's behavior is retrieved at step 516. At step 518, the object (with its state and behavior) is activated in the DBMS server environment (e.g., copied to executable address space in the DBMS server environment). At step 520, the method, or behavior, (e.g., getManager) is invoked in the DBMS server environment.

Whether the object is activated in the DBMS server environment or the client environment, the object (state and behavior) is retrieved from the same source, the DBMS server. There is no need to store an object's state and behavior differently (or in a different location) depending on the environment in which it is activated.

Transactional Retrieval

Previously, at least two separate and distinct steps were required to retrieve an object's state and behavior. In a library environment such as that used in existing object-oriented environments, the state is retrieved from the DBMS and the behavior is retrieved from a file system.

As discussed above, an object's state and behavior can be retrieved from one store (e.g., the DBMS server) using the present invention. State and behavior can therefore be retrieved in a single step, or transaction. Retrieval can be performed using one or more select statements in a single transaction, for example. That is, a single transaction can be used to retrieve the state and the behavior stored in the DBMS server. A transaction is a mechanism used in a DBMS environment whereby a sequence of database operations can be packaged together and performed as a unit.

A transaction is said to have the properties of atomicity, consistency, isolation and durability (or ACID). The atomicity property ensures that all or none of the work comprising a transaction is performed. Without the atomicity property, a portion of the work contained in a transaction could be performed without performing the other. The notion that each transaction is considered to be independent of another transaction is referred to as isolation. That is, that two concurrent transactions do not effect each other other than to the extent that they would effect each other if they were not operating concurrently. A transaction that has been committed and is resistant to a system crash is said to be durable. The consistency property is implied by the existence of the other properties and in the existence of the isolation property in particular.

In addition to object retrieval, the transactional approach can also be used to manipulate an object stored in the DBMS server environment. For example, the transactional approach can be used to update an object's definition (e.g., class definition, state, and/or behavior). An update transaction can include one or more update SQL statements to store modifications to an object (e.g., modifications to the class definition, state, and/or behavior) in the relations. An object can be inserted and deleted using insert and delete (respectively) statements. The operations can be performed as a unit, or transaction.

The ACID properties are preserved when manipulating an object using the invention since object manipulations can be performed in the DBMS server using a single transaction. Further, when an object is manipulated from the DBMS server, the ACID properties can be enforced using the invention. Thus, the invention provides object manipulations that are more reliable and consistent than the multi-step library approach.

Thus, a method and apparatus for coupling object state and behavior in a DBMS has been described in conjunction with one or more specific embodiments. The invention is defined by the claims and their full scope of equivalents.

I claim:

1. A method of coupling object state and behavior in a database management system (DBMS) having one or more relations comprising the steps of:

storing in said one or more relations in said DBMS a class definition;

storing in said one or more relations in said DBMS behavior information;

storing in said one or more relations in said DBMS state information; and obtaining an object instance using said one or more class definition relations, said one or more behavior information relations, and said one or more state information relations.

2. The method of claim 1 further comprising the step of:
   issuing a request for said object instance.

3. The method of claim 2 wherein said object instance is obtained by a client process.

4. The method of claim 1 further comprising the step of:
   determining when said database is to be updated.

5. The method of claim 4 wherein an object manager determines when to update said database.

6. A computer program product comprising a computer usable medium having computer readable code embodied therein for configuring a computer to couple an object state and behavior in a database management system (DBMS) having one or more relations, said computer program product comprising:
   computer readable code configured to cause said computer to store a class definition in said one or more relations in said DBMS;
   computer readable code configured to cause said computer to store behavior information in said one or more relations in said DBMS;
   computer readable code configured to cause said computer to store state information in said one or more relations in said DBMS;
   computer readable code configured to cause said computer to obtain an object instance by utilizing said one or more class definition relations, said one or more behavior information relations, and said one or more state information relations.

7. The computer program product of claim 6 further comprising computer readable code configured to request said object instance from said database.

8. The computer program product of claim 6 further comprising computer readable code configured to cause a computer to execute said object instance on a requester.

9. A computer program product comprising a computer usable medium having computer readable code embodied therein for configuring a computer to couple an object state and behavior in a database management system (DBMS), said computer program product comprising:
   computer readable code configured to cause said computer to store a class definition in said database management system (DBMS);
   computer readable code configured to cause said computer to store behavior information in said database management system (DBMS);
   computer readable code configured to cause said computer to store state information in said database management system (DBMS);
   computer readable code configured to cause said computer to obtain an object instance by utilizing said class definition, said behavior information, and said state information; and
   computer readable code configured to cause said computer to determine if said database management system (DBMS) is in need of an update.

10. The computer program product of claim 9 further comprising computer readable code configured to cause said computer to determine if said behavior information is out of date.

11. A method of coupling object state and behavior comprising the steps of:
    storing behavior information and state information in a database management system (DBMS);
    issuing a request for an object instance to said database management system (DBMS) said request being made by a remote client process;
    obtaining said state information in response to said request.

12. The method of claim 11 further comprising the steps of:
    determining if said behavior information is needed; and
    obtaining said behavior information from said database management system (DBMS) when said behavior information is needed.

13. The method of claim 11 further comprising the step of providing said object instance to a requester.

14. The method of claim 12 wherein said requestor is a client environment.

15. The method of claim 12 wherein said requester is a server environment.

16. A computer program product comprising a computer usable medium having computer readable code embodied therein for configuring a computer, said computer program product comprising:
    computer readable code configured to cause said computer to store behavior information and state information;
    computer readable code configured to cause said computer to issue a request made by a remote client process to a DBMS having one or more relations for an object instance;
    computer readable code configured to cause said computer to obtain said state from said DBMS having one or more relations in response to said request from said remote client process.

17. The computer program product of claim 16 further comprising computer readable code configured to cause said computer to determine if said behavior information is needed and to obtain said behavior information from said database when said behavior information is needed.

18. The computer program product of claim 16 further comprising computer readable code configured to cause said computer to provide said object instance to a requestor.

19. The computer program product of claim 18 wherein said requester is a client environment.

20. A method of coupling object state and behavior comprising the steps of:
    storing a class definition in a database;
    storing behavior information in a database;
    storing state information in a database;
    obtaining an object instance using said class definition, said behavior information, and said state information; and
    issuing a request for said object instance wherein said object instance is obtained by a client process and said client process is an interpreter.

21. A method of coupling object state and behavior comprising the steps of:
    storing a class definition in a database;
    storing behavior information in a database;
    storing state information in a database;
    obtaining an object instance using said class definition, said behavior information, and said state information; and
    issuing a request for said object instance wherein said object instance is obtained by a client process and said client process is a just in time compiler.

22. A method of coupling object state and behavior comprising the steps of:
    storing a class definition in a database;
    storing behavior information in a database;
    storing state information in a database;
    obtaining an object instance using said class definition, said behavior information, and said state information; and
    managing a plurality of requests for said object instance by a plurality of client processes.

23. The method of claim 22 wherein said object instance is obtained by a member of said plurality of client processes.

24. The method of claim 23 wherein said member of said plurality of client processes is a remote client process.

25. A method of coupling object state and behavior comprising the steps of:

storing a class definition in a database;

storing behavior information in a database;

storing state information in a database;

obtaining an object instance using said class definition, said behavior information, and said state information; and managing a plurality of requests by a plurality of client processes for said object instance wherein said object instance is obtained by said plurality of client processes and said client processes are connected to said database over a local area network.

26. A method of coupling object state and behavior comprising the steps of:

storing a class definition in a database;

storing behavior information in a database;

storing state information in a database;

obtaining an object instance using said class definition, said behavior information, and said state information; and managing a plurality of requests by a plurality of client processes for said object instance wherein said object instance is obtained by said plurality of client processes and said client processes are connected to said database over the world wide web.

27. A method of coupling object state and behavior comprising the steps of:

storing a class definition in a database;

storing behavior information in a database;

storing state information in a database;

obtaining an object instance using said class definition, said behavior information, and said state information;

issuing a request for said object instance wherein said object instance is obtained by a client process and said client process is connected to said database via a local area network;

creating a modified object comprising modified state information; and replacing said state information with said modified state information in said database.

28. A method of coupling object state and behavior comprising the steps of:

storing a class definition in a database;

storing behavior information in a database;

storing state information in a database;

obtaining an object instance using said class definition, said behavior information, and said state information;

issuing a request for said object instance wherein said object instance is obtained by a client process and said client process is connected to said database via the world wide web;

creating a modified object comprising modified state information; and replacing said state information with said modified state information in said database.

\* \* \* \* \*